United States Patent
de Cremoux

(10) Patent No.: US 7,453,247 B2
(45) Date of Patent: Nov. 18, 2008

(54) DC TO DC VOLTAGE CONVERTER

(75) Inventor: Guillaume de Cremoux, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 89 days.

(21) Appl. No.: 11/479,470

(22) Filed: Jun. 30, 2006

(65) Prior Publication Data
US 2008/0001587 A1    Jan. 3, 2008

(51) Int. Cl.
G05F 1/00    (2006.01)
G05F 3/16    (2006.01)

(52) U.S. Cl. .................. 323/285; 323/225; 323/259; 323/288

(58) Field of Classification Search ................ 323/222, 323/225, 259, 282, 284, 285, 288, 290, 301
See application file for complete search history.

(56) References Cited

U.S. PATENT DOCUMENTS

| | | | | |
|---|---|---|---|---|
| 5,831,418 A | * | 11/1998 | Kitagawa | 323/222 |
| 6,037,755 A | * | 3/2000 | Mao et al. | 323/222 |
| 6,166,527 A | * | 12/2000 | Dwelley et al. | 323/222 |
| 6,812,676 B2 | * | 11/2004 | Tateishi | 323/225 |
| 6,984,967 B2 | * | 1/2006 | Notman | 323/282 |
| 7,157,888 B2 | * | 1/2007 | Chen et al. | 323/224 |
| 7,176,667 B2 | * | 2/2007 | Chen et al. | 323/282 |
| 7,256,570 B2 | * | 8/2007 | Zhou et al. | 323/224 |
| 7,265,524 B2 | * | 9/2007 | Jordan et al. | 323/225 |
| 7,298,119 B1 | * | 11/2007 | Summit et al. | 323/225 |
| 2006/0176038 A1 | | 8/2006 | Flatness et al. | |

* cited by examiner

*Primary Examiner*—Jessica Han
*Assistant Examiner*—Emily Pham
(74) *Attorney, Agent, or Firm*—Wolf, Greenfield & Sacks, P.C.

(57) ABSTRACT

A DC to DC converter comprising an inductor, first and second electronically controllable switches and a controller, wherein the first electronically controlled switch is interposed between an input node and a first terminal of the inductor and the second electronically controllable switch extends between a second terminal of the inductor and the ground and where a first rectifier extends between the ground and the first terminal of the inductor and a second rectifier connects the second terminal of the inductor to an output node, wherein the controller controls the operation of the first and second switches to perform voltage step down or voltage step up, as appropriate, to achieve a desired output voltage; and wherein the controller is arranged such that the order in which the first and second switches are operated is maintained irrespective of whether the converter is stepping up the input voltage or stepping down the input voltage.

18 Claims, 11 Drawing Sheets

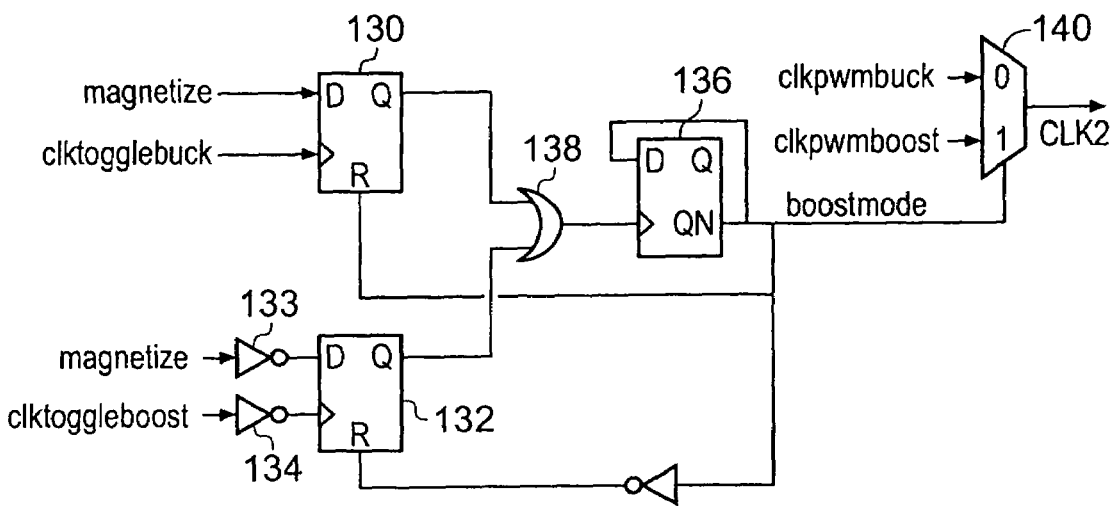
Fig. 7
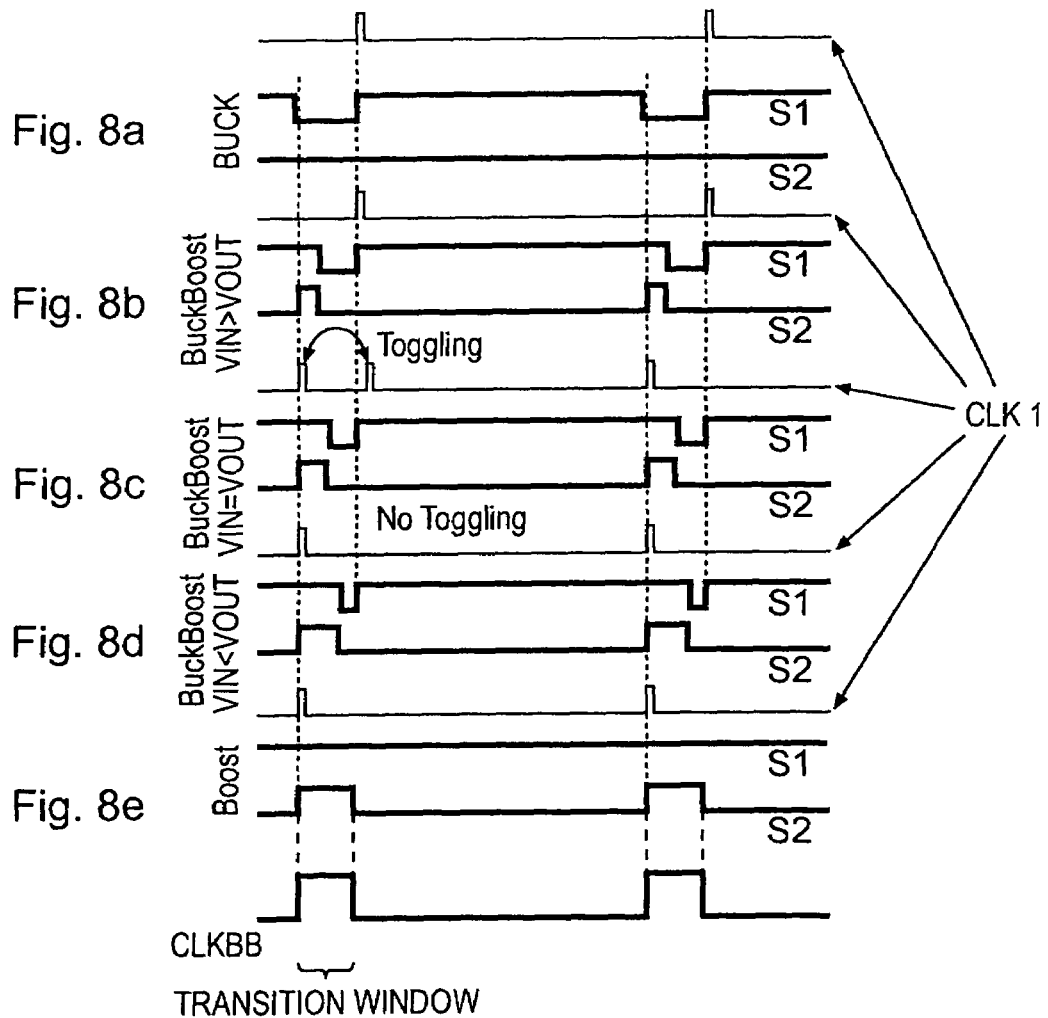
Fig. 8a
Fig. 8b
Fig. 8c
Fig. 8d
Fig. 8e

R① Bypass

R② Fast-Charge

R③ Fast-Discharge

US 7,453,247 B2

DC TO DC VOLTAGE CONVERTER

FIELD OF THE INVENTION

The present invention relates to a DC to DC converter which can smoothly transition between operating to decrease, i.e. to BUCK, an input voltage to generate a desired output voltage to increasing an input voltage, i.e. to BOOST the input voltage, so as to generate the desired output voltage.

SUMMARY OF THE INVENTION

According to a first aspect of the present invention there is provided a DC to DC converter comprising an inductor, first and second electronically controllable switches and a controller, wherein the first electronically controlled switch is interposed between an input node and a first terminal of the inductor and the second electronically controllable switch extends between a second terminal of the inductor and a ground and where a first rectifier extends between the ground and the first terminal of the inductor and a second rectifier connects the second terminal of the inductor to an output node, wherein the controller controls the operation of the first and second switches to perform voltage step down or voltage step up, as appropriate, to achieve a desired output voltage and wherein the controller is arranged such that the order in which the first and second switches are operated is maintained irrespective of whether the converter is stepping up the input voltage or stepping down the input voltage.

It is thus possible to have a smooth transition between BUCK and BOOST modes.

Advantageously transition regime detecting means are provided for detecting when |Vout−Vin| is sufficiently small that the operation of the switches should be modified to force a current ripple to occur within the inductor. The ripple can be maintained above a minimum ripple value. Within the transition regime the sequence of operation of the switches is maintained and there is a monotonic progression in switching times as a progression is made from Vin<<Vout to Vin>>Vout and back. Thus, there are no discontinuities in operation around Vin=Vout.

Preferably the first and second rectifiers are active rectifiers implemented by third and fourth electronically controlled switches, respectively. The third electronically controlled switch can be controlled to be open when the first electronically controlled switch is closed and vice versa. Thus the control signals for the first and third switches can be complementary. The same holds true for the second and fourth electronic switches.

According to a second aspect of the present invention there is provided a method of operating a DC to DC converter comprising an inductor, first and second electronically controllable switches and a controller, wherein the first electronically controlled switch is interposed between an input node and a first terminal of the inductor and the second electronically controllable switch extends between a second terminal of the inductor and a ground and where a first rectifier extends between the ground and the first terminal of the inductor and a second rectifier connects the second terminal of the inductor to an output node, wherein the controller is arranged to control the operation of the first and second switches to perform voltage step down or voltage step up, as appropriate, to achieve a desired output voltage; and wherein the controller is arranged to operate the switches such that the order in which the first and second switches are operated is maintained irrespective of whether the converter is stepping up the input voltage or stepping down the input voltage.

BRIEF DESCRIPTION OF THE DRAWINGS

The present invention will further be described, by way of non-limiting example only, with reference to the accompanying drawings, in which:

FIG. 7 shows an example embodiment of a combinational logic circuit for use with the circuit of FIG. 4 for selecting which signal from those (CLKPWMBUCK and CLKPWM-BOOST) shown in FIG. 5 is to be used as CLK1.

FIGS. 8a to 8e show timing diagrams for generation of control signals for switches S1 and S2 (as shown in FIGS. 1 and 4) as the circuit of FIG. 4 transitions from BUCK mode; to BUCKBOOST mode and finally to BOOST mode;

DESCRIPTION OF PREFERRED EMBODIMENTS OF THE INVENTION

Figure 1:
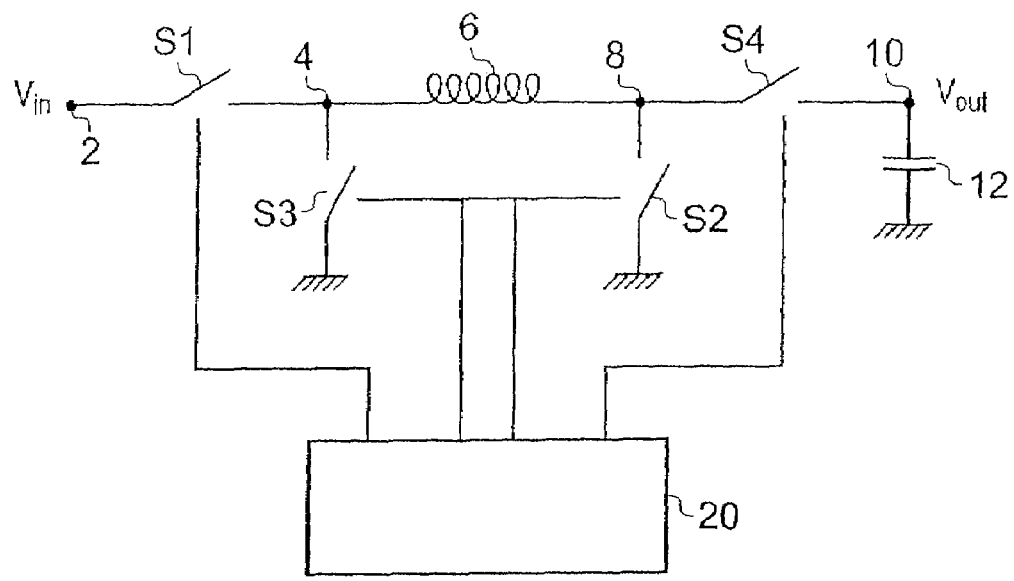
FIG. 1 schematically illustrates a basic configuration for a BUCKBOOST converter.

A DC to DC voltage converter operable to increase, i.e. BOOST, an input voltage Vin or to reduce, i.e. BUCK, an input voltage Vin is shown in FIG. 1.

The converter comprises an input node 2 which is connected to a first terminal 4 of an inductor 6 via a first electrically controlled switch S1. A second switch S2 extends between a second terminal 8 of the inductor 6 and ground. A third electrically controlled switch S3 extends between the first terminal 4 of the inductor 6 and ground. A fourth switch S4 extends between the second terminal 8 of the inductor 6 and an output node 10. A filtering capacitor 12 is connected between the output node 10 and ground. The switches S3 and S4 provide commutation paths and act as active rectifiers. They can be replaced by diodes if desired.

The switches are driven by a controller 20 which provides control signals to the switches.

The basic operation of the converter circuit is well known, but will be briefly described for completeness.

Buck Converter Mode

In this mode Vin is greater than Vout. The controller acts to generate a desired output voltage Vout from the input voltage Vin. This can be achieved by selectively controlling the states of switches S1 and S3. In this mode S2 is kept permanently open (high impedance) and S4 is kept closed (low impedance).

Switches S1 and S3 are driven in anti-phase. This ensures that both switches are not simultaneously conducting which would cause the input voltage Vin to short circuit to ground.

In a first phase, which can be regarded as a magnetisation phase, S1 is closed and S3 is open. Therefore the voltage across the coil, Vcoil, is $$Vcoil = Vin - Vout \qquad \text{Equation 1}$$

And the rate of change of current, and more particularly of current build up is given from $$\frac{dI}{dt} = \frac{(Vin - Vout)}{L} \qquad \text{Equation 2}$$

Figure 2:
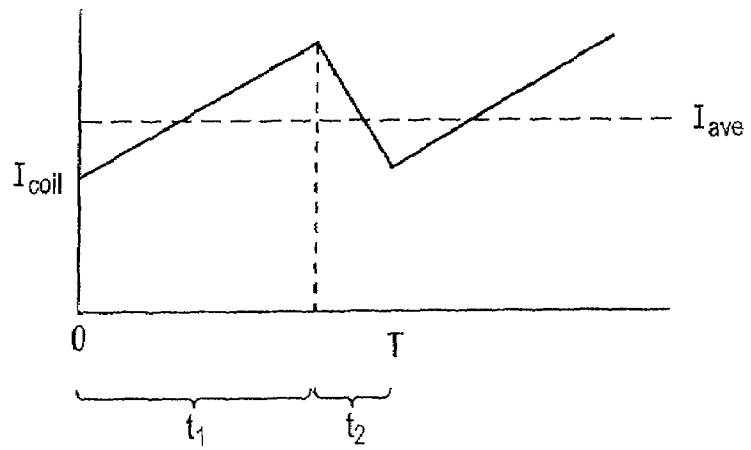
FIG. 2 schematically shows current ripple within the inductor of the circuit of FIG. 1 in BUCK mode when Vin is significantly greater than Vout.

This current flows for a first time period $t_1$ as shown in FIG. 2, towards the output node 10 where some of the current is supplied a load and some of the current changes the capacitor 12 such that a small increase occurs in the voltage Vout across the capacitor.

The controller 20 monitors the output voltage Vout and the regulation loop causes switch S1 to open and switch S3 to close.

This causes the voltage across the inductor to become $$Vcoil = 0 - Vout = Vout. \qquad \text{Equation 3}$$

Consequently the rate of change of current flow in the inductor 6 becomes $$\frac{dI}{dt} = \frac{-Vout}{L} \qquad \text{Equation 4}$$

Thus, in a second period the current flow in the coil 6 starts to decrease, as shown in period t2. Meanwhile current is being drawn from the load so the voltage Vout may fall a little. This process, which can be regarded as a switching cycle or a control cycle, is repeated by the controller, typically at a repetition rate of 500,000 to 3,000,000 times per second. This provides very fine control of the input voltage and the voltage ripple thereon.

It can be seen in FIG. 2 that the instantaneous current varies around an average value $I_{ave}$ which represents the average current being drawn by the load—and assumed for simplicity to be constant over the two switching cycles shown in FIG. 2.

Boost Mode

When it is desired to make Vout greater than Vin, then the circuit can be operated in a BOOST mode.

In this mode switch S1 is left closed (low impedance) and S3 is left open (high impedance). Switches S2 and S4 are operated in anti-phase.

During a magnetisation phase S4 is opened and S2 is closed. Therefore the voltage across the coil is given by $$Vcoil = Vin - 0 = Vin \qquad \text{Equation 5}$$

and consequently the rate of change of current in the coil is given by $$\frac{dI}{dt} = \frac{Vin}{L} \qquad \text{Equation 6}$$

so the current builds relatively rapidly. After a time period $t_3$ the controller 20 opens switch S2 and simultaneously closes switch S4.

Current from the coil now flows towards the load and into the output capacitor 12, thereby charging it, as the magnetic flux around the coil collapses.

During this phase the voltage across the coil is $$Vcoil = Vin - Vout \qquad \text{Equation 7}$$

and $$\frac{dI}{dt} = \frac{-Vin + Vout}{L} \qquad \text{Equation 8}$$

Figure 3:
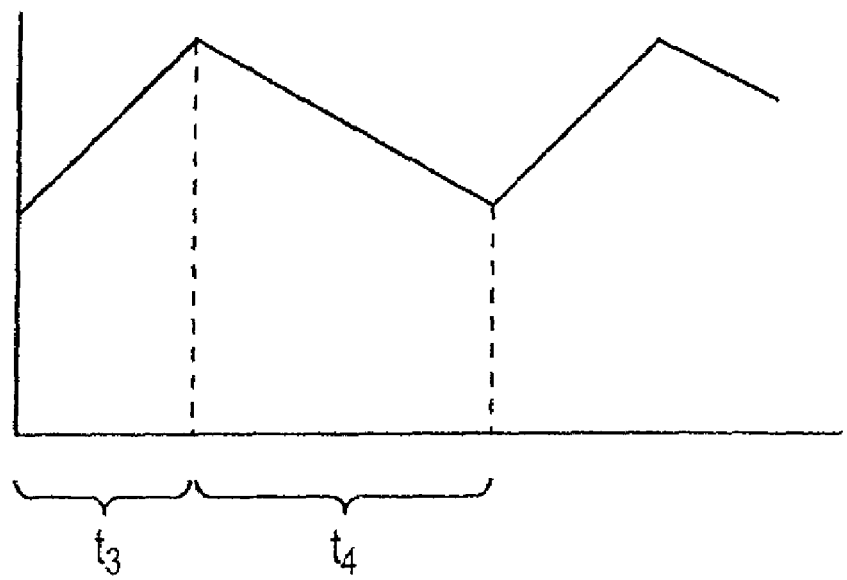
FIG. 3 schematically illustrates current ripple in the coil when the circuit is operating in BOOST mode when Vin is significantly smaller than Vout.

This can be considered as a demagnetisation phase, and is designated $t_4$ in FIG. 3.

Without going into rigorous analysis, it can be shown that if a duty cycle D represents the proportion of the time that switch S1 is conducting then, for the BUCK converter $$Vout = Vin \cdot D \qquad \text{Equation 9}$$

If the duty cycle represents the proportion of time that the switch S2 is conducting, then for the BOOST converter $$Vout = \frac{Vin}{1 - D} \qquad \text{Equation 10}$$

These BUCK and BOOST converters work very well when the difference between Vin and Vout is relatively large.

However their operation can become compromised when the difference between Vout and Vin starts to fall.

This can be seen because each converter relies on there being a change in the current flowing through the coil during the control cycle. But if Vin and Vout are nearly equal then the rate of increase of current in the magnetisation phase of the BUCK converter $$\frac{dI}{dt} = \frac{(Vin - Vout)}{L} \qquad \text{Equation 11}$$

and the rate of decrease in the demagnetisation phase of the BOOST converter $$\frac{dI}{dt} = \frac{Vout - Vin}{L} \qquad \text{Equation 12}$$

both tend to zero.

Users also want an output voltage to be well regulated even though the input voltage may span a range that includes Vout.

Thus sometimes the BUCK converter operation may be required whereas other times a BOOST converter may be required.

Under such circumstances it is desirable to be able to transition smoothly between five ill defined operating regimes. These can be listed as 1) Vin>>Vout
2) Vin>Vout
3) Vin=Vout
4) Vin<Vout
5) Vin<<Vout In regime 1 the converter can be operated as a BUCK converter. In regime 5 the converter can be operated as a BOOST converter.

Regimes 2, 3 and 4 represent transitions between BUCK and BOOST modes of operation.

In order to avoid glitches it is desirable to make a smooth transition between regimes.

Figure 4:
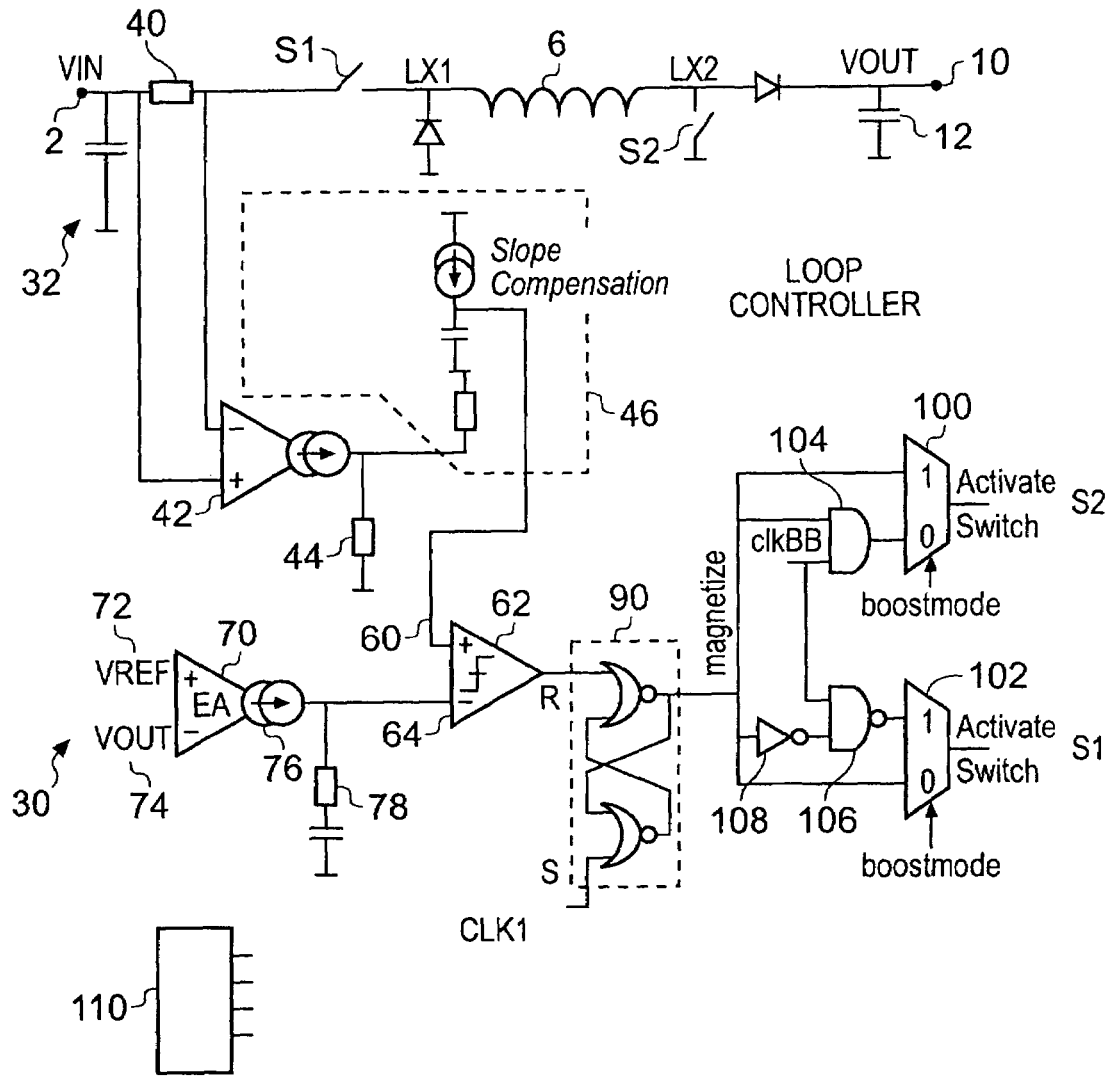
FIG. 4 shows a BUCKBOOST converter and its controller in greater detail, this arrangement constituting a first embodiment of the present invention.

FIG. 4 shows a controller, generally designated 30, in combination with the converter circuit 32. The converter circuit 32 corresponds to that shown in FIG. 1, but switches S3 and S4 can either be driven in anti-phase from the switch control signals of switches S1 and S2, respectively, or they can be replaced by diodes as shown in FIG. 4.

A current sensor is provided to sense the current flowing in the coil during the magnetisation phase (current building in the coil). In the embodiment shown in FIG. 4 the current sensor is a resistor 40 provided between the input node 2 and the coil 6.

The instantaneous voltage across the resistor 40 is measured by a differential amplifier 42 which produces an output proportional to the current flowing in the coil 6 when switch S1 is conducting. The output of the amplifier can be in the current domain or the voltage domain at the choice of the designer. In the embodiment shown in FIG. 4 the amplifier 42 is a transconductance device and hence it outputs a current proportional to the voltage difference across the current sensing resistor 40. This current is converted to a voltage by resistor 44, and is supplied to an input, in this example a non-inverting input 60, of a comparator 62. Optionally the output of the amplifier 42 may be level shifted by adding a time varying voltage ramp. This operation is well know as the slope-compensation and is performed by the network 46.

The controller 30 further comprises a voltage error amplifier 70 which receives a reference voltage at its non-inverting input 72 from a voltage reference (not shown). An inverting input 74 of the amplifier 70 is connected to the output node 10 (connection not shown for clarity) and forms at its output 76 a signal representative of the difference between the output voltage and the reference voltage. The amplifier typically has a gain of a thousand (or a similar order of magnitude) such that voltage errors of 1 mV give rise to error voltages of around 1 volt. In the example shown in FIG. 4, the amplifier 70 is a transconductance amplifier in association with a current to voltage conversion impedance 78. The impedance may include a capacitor so that errors are integrated, so as to provide improved precision. It also enhances the circuit's immunity to noise.

The output of the voltage error amplifier 70 is provided to an inverting input 64 of the comparator 62.

A set reset (SR) latch 90 formed, for example, by a pair of cross-coupled NOR gates, receives an output of the comparator 62 at its R (reset) input. A set input of the comparator receives a first clock signal CLK1 which occurs every conversion cycle.

An output of the latch 90 is provided to a first input (designated "1") of a first multiplexer 100, to a second input (designated "0") of a second multiplexer 102, to a first input of an AND gate 104 and to a first input of a NAND gate 106 via an inverter 108. The second inputs of the AND gate 104 and the NAND gate 106 receive a further clock signal, CLKBB.

An output of the AND gate 104 is connected to a second input (designated "0") of the multiplexer 100 who's output is used to control operation of the switch S2. An output the NAND 106 is connected to a first input (designated "1") of the multiplexer 102 who's output is used to drive switch S1.

Additionally a clock generation circuit 110 is provided to generate a series of clock signals at the same frequency and which are in a predetermined relationship with respect to one another. The clock signals provided by the clock generation circuit 110 are shown diagrammatically in FIG. 5.

The clock signal CLKBB can be regarded as a master clock signal. It has the longest duration of any of the clock signals and in this example is asserted (has a logical "1" value) for around 250 to 300 ns. It can be seen that, in this example, the switching frequency of the converter is around 600 KHz.

A second clock, CLKPWMBUCK, is asserted at the falling edge of CLKBB for a '1'-state that has been chosen to be shorter than that of CLKBB, and which in this example has a duration of around 50 ns.

A third clock, CLKPWMBOOST, is asserted at the rising edge of the master clock, CLKBB and also has a '1'-state which in this example has been chosen to be shorter than that of CLKBB, and to have an asserted duration of around 50 ns.

Fourth and fifth non-overlapping clocks CLKTOGGLE-BUCK and CLKTOGGLEBOOST, respectively, are arranged to be asserted for the same amount of time, around 100 ns in this example, with CLKTOGGLEBOOST commencing at the rising edge of the master clock, CLKBB, and CLKTOGGLEBUCK finishing at the falling edge of the master clock, CLKBB.

The operation of the controller 30 will now be explained.

Suppose, for simplicity, that we start with Vin sufficiently greater than Vout such that the converter is working as a BUCK converter.

In this regime CLKPWMBUCK is selected to be CLK1. Therefore, as shown in FIG. 6, CLK1 coincides with the falling edge of the master clock, CLKBB. Additionally as the circuit is operating as a BUCK converter we start with the control signal "BOOSTMODE" for the multiplexers 100 and 102 set to zero so that the second ("0") channel is selected as the output.

Figure 6A:
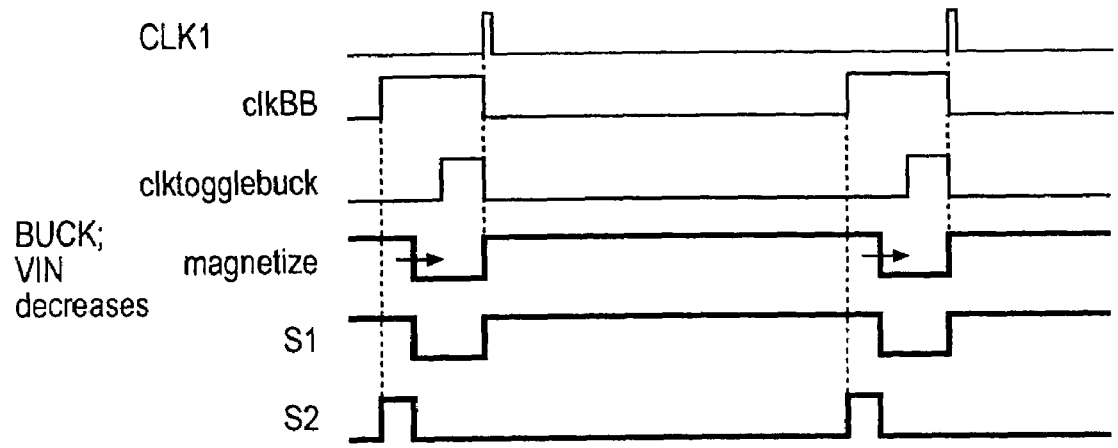
FIG. 6a shows a timing diagram for the circuit of FIG. 4 operating in BUCK mode.

When Vin>>Vout, such that the input voltage exceeds the output voltage by a first threshold, then the duty cycle is short and a signal designated "MAGNETIZE" in FIG. 6a which represents a control signal for switch S1 and which occurs at the output of the latch 90 is asserted only briefly.

However as Vin approaches Vout (suppose that the input voltage decreases as Vout should be a constant) then from the preceding analysis we see that the duty cycle has to increase, and the period of time that magnetize is asserted increases.

We can also see, that MAGNETIZE is asserted when CLK1 occurs as CLK1 "SETS" the latch 90. A "1" from the output of the latch 90 is provided to the second ("0") channel of multiplexer 102 which has its output provided to a control terminal of switch S1. Thus S1 is closed when CLK1 is asserted and continues to be closed until such time as the current flowing in the coil 6 rises to a point where the voltage occurring at the non-inverting terminal 60 of the comparator 62 is greater than the voltage occurring at the inverting terminal 64 thereof.

As noted before, it is desirable to smoothly transition between operating modes, and FIG. 6a shows a control cycle where Vin has fallen to a point where it is not significantly greater than Vout, i.e. it is now below the first threshold. As a consequence the ON time of "MAGNETIZE" has become sufficiently extended that it has started to overlap with the succeeding CLKBB signal.

Once overlap starts to occur it is detected by a further circuit, which will be described later, and is used to generate a control signal for switch S2 so as to cause it to switch on. Causing S2 to start conducting in this way helps to maintain a current ripple in the coil 6 which is required to ensure proper operation of the converter. Thus a period of time is established, as will be described later, which acts as a transition window in which both S1 and S2 conduct.

As Vin decreases further, the duration of MAGNETIZE will lengthen further until such time as it overlaps with the clock signal CLKTOGGLEBUCK.

This causes the clock CLKPWMBUCK to be deselected from acting as CLK1, and instead CLKPWMBOOST is selected to form the clock CLK1. Also, BOOSTMODE gets toggled so its value becomes 1.

As the value of Vin decreases further the amount of time for which S1 is switched off decreases, and the duration for which S2 is switched on increases.

Figure 6B:
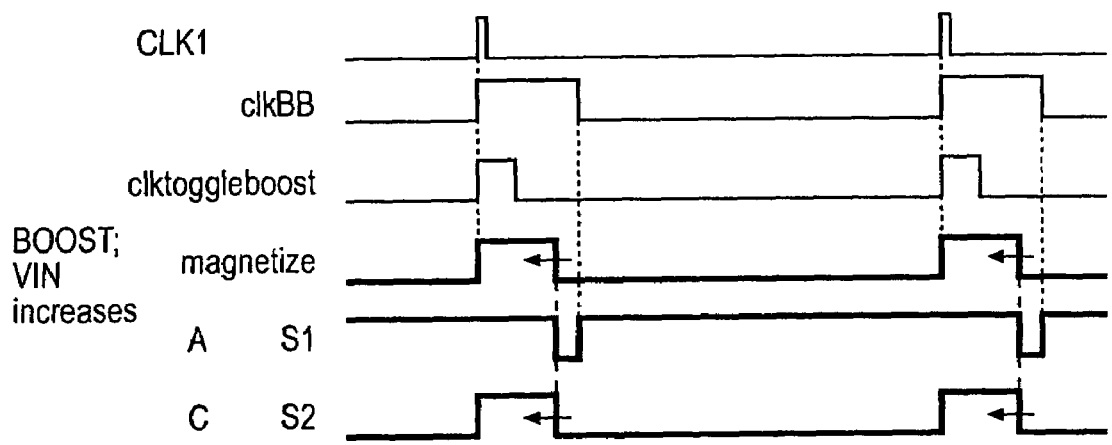
FIG. 6b shows a timing diagram for the circuit of FIG. 4 operating in BOOST mode.

As Vin decreases further it can be seen that the controller ceases to reduce the input voltage to form the output voltage, but now has to step the input voltage up, hence it has to operate in BOOST mode, as shown in FIG. 6b. Ultimately in BOOST mode the controller moves to a stage when S1 is permanently conducting and only S2 is switched when Vin<<Vout. However when Vin is nearly equal to Vout or only slightly less than Vout, it is still desirable to maintain some current ripple in the inductor so that the output voltage can still be controlled.

This is done by looking for an overlap between CLKBB and a period when "MAGNETIZE" is not asserted, and this period is used to generate a signal to inhibit conduction through switch S1 during this "overlap" period.

Switch S2 on the otherhand is being driven directly by the MAGNETIZE signal and as Vin becomes progressively less than Vout the overlap period reduces so switch S1 tends to becoming permanently on and the duration for switch S2 is conducting starts to increase.

Finally we move into a pure BOOST regime where only S2 (and S4) switches states.

In BOOST mode the control circuit 30 still operates in the same way as it did in BUCK mode so we get a smooth transition in the switching sequence of switches S1 and S2, with the switches always having S2 conducting prior to S1 conducting during the transitional modes where both switches have conduction periods in a control cycle.

It can be seen that CLKBB defines first and second thresholds. Thus while the input voltage Vin exceeds the output voltage Vout by more than the first threshold, then S1 switches off before CLKBB becomes asserted for the next conversion cycle. As the input voltage drops, we get to a point where Vin is greater than Vout by the first threshold voltage and consequently the on period switch S1 starts to overlap with CLKBB. This marks the commencement of a transition regime where S1 and S2 can conduct simultaneously with a period defined by CLKBB being asserted and which can itself be thought of as a transition window.

As the input voltage decreases, then within the transition window the period of time for which S1 and S2 are simultaneously conducting starts to increase.

When the input voltage has fallen to the point where it is substantially equal to Vout then without the transition window S1 and S2 are both conducting for roughly half the time. Outside of the transition window S1 is on and S2 is off.

As the input voltage decreases further we have Vin less than Vout. While |Vout−Vin| is less than a second threshold we still have a period within the transition window where both S1 and S2 are simultaneously non-conducting.

Finally as Vin reduces further such that |Vout−Vin| is greater than a second threshold we reach a stage where S1 never switches off and S2 switches on and off, as required, in response to the signal MAGNETIZE.

If we now assume that Vin is much less than Vout we start with pure BOOST operation and the duty cycle period will be fairly long.

The clock for CLK1 is derived from CLKPWMBOOST which occurs at the leading edge of CLKBB as shown in FIG. 6b. BOOST mode is set to "1" so the "MAGNETIZE" signal activates switch S2 via the multiplexer 100.

As Vin rises, the step-up required reduces and hence the duration of "MAGNETIZE" reduces. The signal "MAGNETIZE" is asserted by CLK1 and reset under the control of the comparator 62 and the associated operational amplifiers 42 and 70. Eventually as Vin increases the duration of MAGNETIZE becomes reduced to less than the duration of CLKBB the NAND gate 106 and inverter 108 combine CLKBB and "MAGNETIZE" so as to assert a signal when CLKBB is asserted whilst MAGNETIZE is not asserted. This signal is propagated through multiplexer S1 and used to drive switch S1 to become conducting. Thus we have entered the transition regime again.

As the input voltage rises, the trailing edge of "MAGNETIZE" progressively moves towards the leading edge of "MAGNETIZE" and hence the time for which S1 is non-conducting continues to increase. Eventually MAGNETIZE becomes sufficiently brief that its trailing edge occurs within the time span counted by the clock CLKTOGGLEBOOST. When this occurs a swap of the operational mode is performed which that CLK1 becomes based on CLKPWMBUCK and BOOSTMODE is toggled from "1" back to "0".

FIG. 7 illustrates a circuit for comparing the relative timings of "MAGNETIZE", CLKTOGGLEBUCK and CLKTOGGLEBOOST, and thereby to select the correct value for BOOSTMODE and to select the correct one of CLKPWMBUCK and CLKPWMBOOST for CLK1.

A D type register 130 has a data input connected to MAGNETIZE and a clock input connected to CLKTOGGLEBUCK. Thus the state of MAGNETIZE is examined each time CLKTOGGLEBUCK occurs, and if MAGNETIZE has extended in time sufficiently within the transition window defined by CLKBB to still be high (i.e. logic 1) at CLKTOGGLEBUCK then its state is captured by the register 130 and an output Q of the register 130 goes high. This is provided, via an OR gate 138 to a bistable 136 formed from a further D type register having its data input connected to an inverted version of its output. The inverted (or indeed non-inverted) output of the D type register 136 provides the "BOOSTMODE" signal.

In order to toggle from the BUCK mode to the BOOST mode a further D type register 132 receives an inverted version of MAGNETIZE from an inverter 133, and is clocked with an inverted version of CLKTOGGLEBOOST from an inverter 134. An output of the register 132 is provided as an input to the register 136 via the OR gate 138.

In order to reset the registers 130 and 132, the inverted output of register 136 is provided to a reset terminal of the register 130 and an inverted version of this signal (such as the non-inverted output of the register 136) is provided to the reset terminal of the register 132.

The BOOSTMODE signal is also supplied to an input of a multiplexer 140 which acts to select which one of CLKPWMBUCK and CLKPWMBOOST is used as CLK1.

Figure 5:
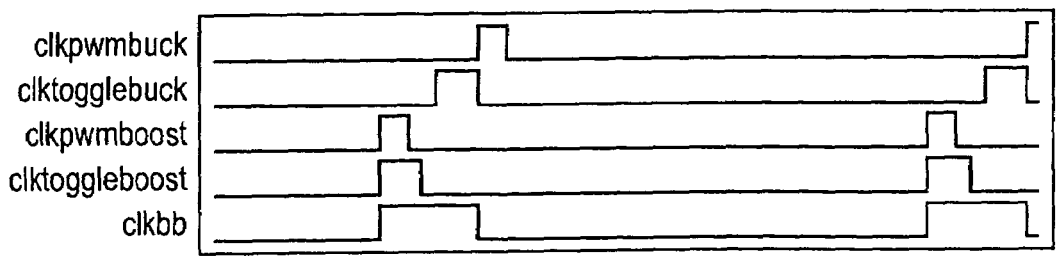
FIG. 5 is a timing diagram showing the relative timings of clock signals used within the circuit of FIG. 4.

FIGS. 8a to 8e schematically illustrate timing diagrams showing the relative times of the clock CLK1 compared to the switch control signal for switches S1 and S2. Starting at FIG. 8a, where the converter is operating in BUCK mode. Switch S1 becomes active when clock pulse CLK1 arrives, which as shown in FIG. 5 is derived from CLKBB and occurs at the trailing edge of it. As illustrated in FIG. 8a, the input voltage is such that the on time for switch S1 has extended to nearly meet the leading edge of the subsequent pulse from CLKBB. This can be thought of as being a first mode of operation. As we move from FIG. 8a to FIG. 8b, the input voltage becomes reduced such that the switch on time for switch S1 which was asserted at the trailing edge of one pulse of CLKBB now overlaps with the leading edge of the subsequent clock pulse CLKBB. This corresponds to a second mode of operation. This overlap time was determined by AND gate 104 of FIG. 4 and used to generate a signal to switch S2 on. This gives rise to current build up in the coil 6 while S1 and S2 are simultaneously conducting, although this current decays again whilst S1 and S2 are simultaneously non-conducting. The duration of the pulse controlling S2 gradually lengthens as the input voltage decreases, whilst the duration of the off time for switch S1 gradually shortens as the input voltage decreases. Thus, comparing FIGS. 8b and 8c where the input voltage now equals the output voltage, (this corresponds to a third mode of operation) the on time for switch S2 substantially equals or slightly exceeds the off time for switch S1 also importantly and with reference to FIG. 6a, we can see that as the falling edge of the MAGNETIZE signal moves closer to the falling edge of CLKBB, it eventually triggers the toggle monitored by the circuit shown in FIG. 7 to cause CLK1 to be selected from a different clock pulse. Thus, in FIGS. 8a and 8b CLK1 coincides with the falling edge of CLKBB but in FIG. 8c, and subsequently 8d and 8e CLK1 coincides with the rising edge of CLKBB.

As the input voltage decreases further, we move from the regime shown in FIG. 8c to that shown in FIG. 8d, which can be regarded as a fourth mode of operation, where it can be seen that the portion of time for which S2 is on grows and that the portion of time for which S1 is off shrinks. In each of FIGS. 8b, 8c and 8d the pulse controlling S2 to switch on has, within the confines of the transition window defined by CLKBB, always preceded the pulse controlling S1 to switch it off.

As the input voltage drops further, and we transition from FIG. 8d to FIG. 8e, the pulse controlling S2 continues to lengthen and the pulse switching off S1 continues to shorten until the limiting condition where it ceases to exist at all.

It is significant to note that at no time is there a switching of the order of the pulses controlling S1 and S2 during this transition from BUCK to BOOST or back again. Thus a gradual transition is observed, working from 8a to 8e where the control pulse switching on S2 first of all doesn't exist, then it starts to emerge at a time corresponding to the rising edge of CLKBB and gradually grows and grows in length. Similarly, the "space" in the switching signal for transistor S1 gradually shrinks away to nothing as we move from FIG. 8a to 8e but the space for S1 always follows, in this example, the "mark" in the pulse train for S2. Therefore a controlled and continuous transition between regimes is assured without giving rise to any switching glitches at the transition from BOOST style operation to BUCK style operation or back again. This is important in obtaining good performance and in particular it is important for avoiding switching transients when changing modes.

Other BUCK/BOOST converters, such as the LTC3780 available from Linear Technology exhibit transients in their output voltage when switching form one mode to the other, as for example set out in the "line transient" graphs at page 8 of the datasheet for the LTC3780 available from http://www.linear.com/pc/downloadDocument.do?navID=H0,C1,C1003, C1042,C1116,P10090,D7197 (downloaded June 2006).

Figure 9:
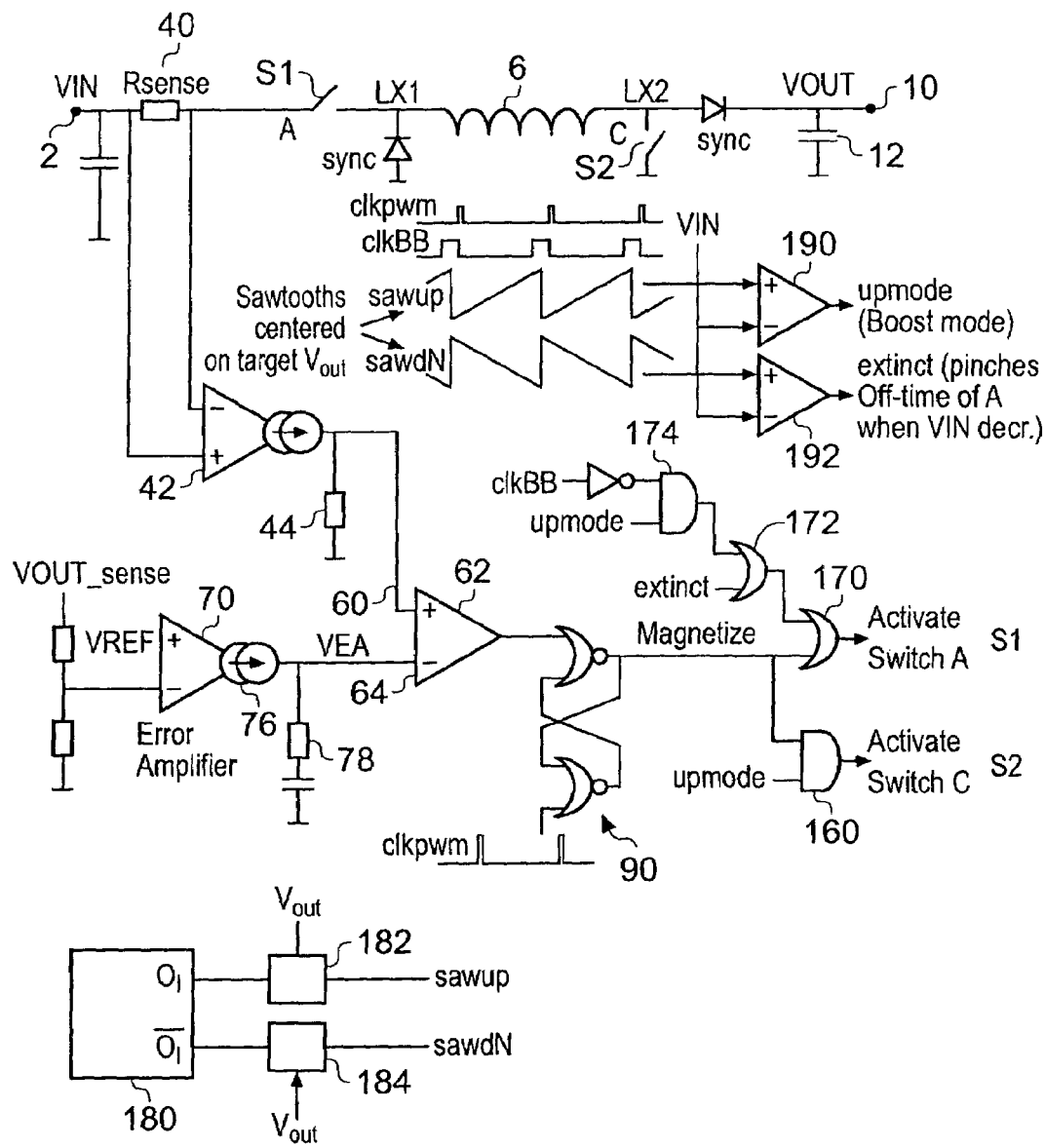
FIG. 9 shows a DC to DC converter and associated controller constituting a second embodiment of the present invention.

FIG. 9 illustrates a further BUCKBOOST converter controller constituting an embodiment of the present invention. The arrangement shown in FIG. 9 is current controlled and hence is similar to that shown in FIG. 4, and like parts are designated with like reference numbers. Thus an estimate of the current flowing into the inductor 6 is determined by resistor 40 amplified by differential amplifier 42 and provided to the non-inverting input of comparator 62. Meanwhile an estimate of the output voltage is provided to an inverting input of an error amplifier 70 which compares the output voltage with a reference voltage provided at its non-inverting input and provides this signal to the inverting input of the comparator 62. An output of the comparator 62 is, was the case with FIG. 4, connected to an input of a set-reset latch 90. The output of the latch 90 represents the "MAGNETIZE" signal.

The MAGNETIZE signal is provided to a first input of an AND gate 160 which receives an "UPMODE" signal at a second input thereof. If both MAGNETIZE and UPMODE are asserted then the output of the AND gate 160 is asserted and this is used to activate switch S2 in order for it to become conducting. The MAGNETIZE signal is also sent to a first input at an OR gate 170. Thus if MAGNETIZE is active then the output of the OR gate is active and this is used to switch S1 on. A second input of the OR gate receives a signal from a further OR gate 172 which receives signals EXTINCT at a first input and output of an AND gate 174 which receives at its first input the UPMODE signal and at its second input an inverted version of CLKBB. CLKBB in this example is the same as that used in respect of the previous embodiment when the BUCK-mode was selected.

A saw tooth generator generates a saw tooth at its first output 01 and a complimentary version of a saw tooth at a second output $\overline{01}$.

These outputs can be centred around the target output voltage Vout or alternatively, and as shown in FIG. 9, may be supplied to respective level shifting circuits 182 and 182 which are supplied with a version of the target output voltage Vout and shift the complimentary saw tooth waveforms to form the signals SAWUP and SAWDN. Each of which has a midpoint value that corresponds to the output voltage Vout. In a preferred embodiment, the saw teeth have a magnitude of ±1 volt around Vout The SAWUP waveform is provided to the non-inverting input of a comparator 190 and which has its inverting input connected to the input terminal for the input voltage Vin. An output of the comparator 190 represents the UPMODE signal which is an input to the AND gate 160 and the AND gate 174. A second comparator 192 receives the SAWDN signal at its non-inverting input and once again has its inverting input connected to receive the input voltage Vin. An output of the comparator 192 is used to form the EXTINCT signal which is provided as an input to the OR gate 172.

The invention also works if the saw teeth waveforms are slightly offset in time from one another, as it provides protection against transition glitches at comparators 190 and 192.

The action of the gates 160 to 174 is to combine the UPMODE, EXTINCT and MAGNETIZE the signals such that S1 is driven if

MAGNETIZE=1;

or

EXTINCT=1;

or

UPMODE=1 while CLOCKBB does not equal 1.

The converter is operable to work solely as BUCK converter, solely as a BOOST converter or as a BUCK-BOOST converter. The operation in BUCK-BOOST mode occurs within a BUCK-BOOST window defined by the magnitude of SAWUP and SAWDN. In this embodiment SAWUP and SAWDN have the same central value, Vout, and the same peak to peak voltage.

If we consider initially the extremes of operation then, if Vin is greater than SAWUP and Vin is greater than SAWDN then UPMODE equals zero and EXTINCT equals zero. Consequently the switch S2 is always off (and consequently S4 is always on) and the switch S1 is driven by the signal MAGNETIZE. This represents pure BUCK operation.

If Vin is less than SAWUP and Vin is less than SAWDN then UPMODE equals 1 and EXTINCT equals 1. Consequently switch S1 is always on (and S3 is always off) and the switch S2 is driven by the signal MAGENTIZE. This is a case of pure BOOST mode operation.

Within the BUCKBOOST window there are three cases of operation as will be described hereinafter with reference to FIGS. 10 to 14.

Figure 10:
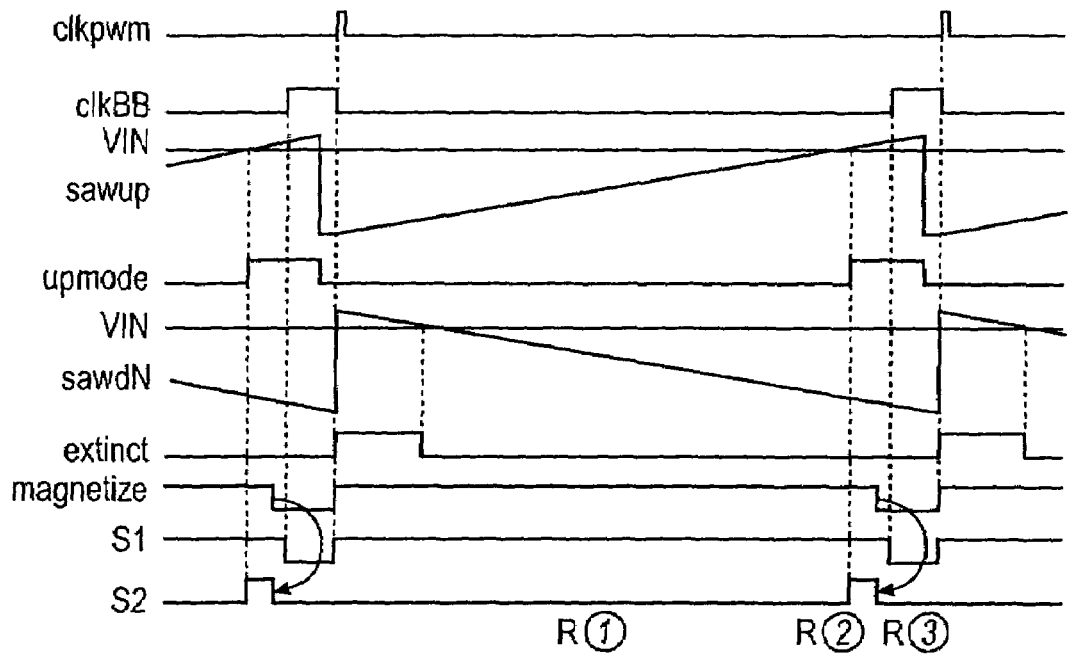
FIG. 10 is a timing diagram showing the relative timing of various control signals within the circuit of FIG. 9 when operating in a BUCKBOOST mode with Vin>Vout.

FIG. 10 schematically illustrates a situation in which Vin is greater than Vout but is not sufficiently great so as to inhibit the BUCK-BOOST mode of operation. In particular, it can be seen that the SAWUP waveform has a period in which it exceeds the voltage Vin thereby giving rise to a period of time in which the signal UPMODE is asserted. This in turn causes switch S2 to be closed such that the inductor is charged at a faster rate (with the rate of change of current being equal to Vin/L instead of (Vin−Vout)/L. The saw tooth SAWDN also exceeds Vin in a time period just after UPMODE becomes reset. The time period for which SAWDN exceeds Vin results in the generation of the signal EXTINCT. Moreover, the current mode regulation circuit comprising operational amplifier 42, operational amplifier 70 and comparator 62 is also active and serves to slightly shorten the duration of the signal MAGNETIZE in response to the faster rate of current build up within the inductor 6. As a consequence of MAGNETIZE going low (logical zero) before EXTINCT becomes asserted then a period of time exists within the duration of CLKBB being asserted when switch S1 becomes non-conducting while switch S2 is also non-conducting, giving rise to a fast discharge.

Figure 11A:
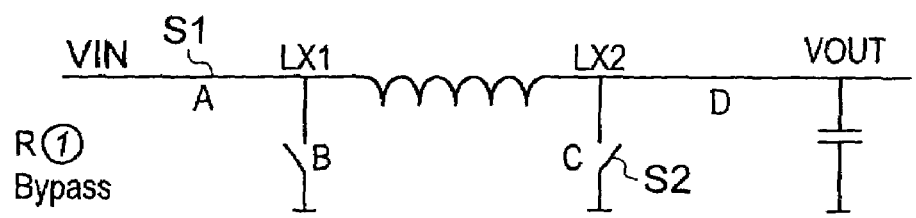
FIGS. 11a to 11c show the switch positions for the DC to DC converter in various stages of its operation.
Figure 11B:
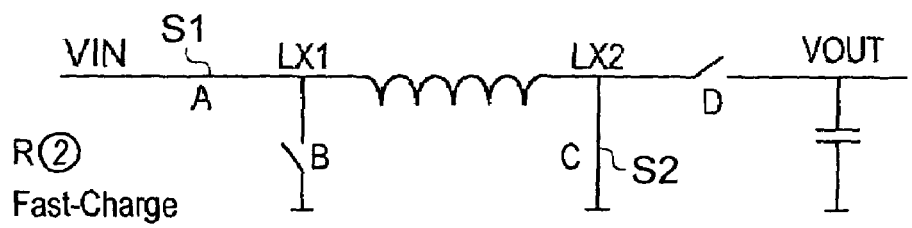
Figure 11C:
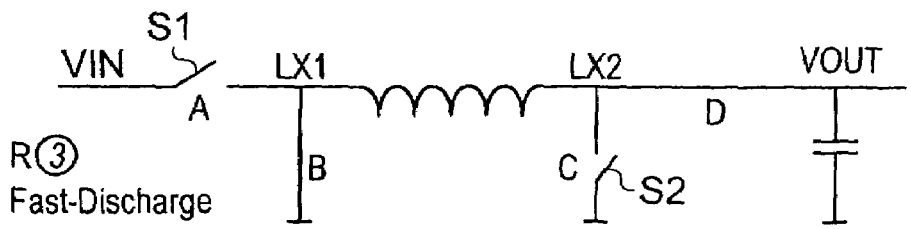

The various switching regimes are designated R1, R2 and R3 within FIG. 10 and the corresponding switch positions for each of these regimes is illustrated in the FIGS. 11a to 11c, respectively.

Figure 12:
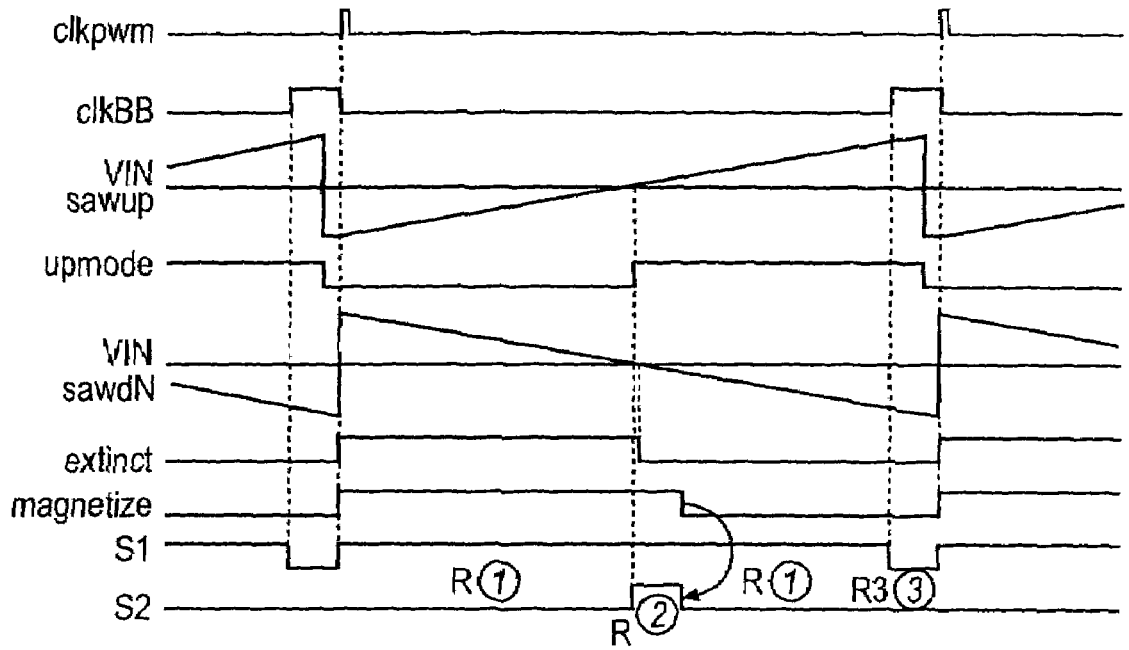
FIG. 12 is a timing diagram showing the relative timings of the various control signals within the circuit of FIG. 9 when Vin is approximately equal to Vout.

FIG. 12 illustrates the operation of the circuit when Vout is approximately equal to Vin. It can be seen that SAWUP exceeds the value of Vin for approximately half the time and consequently the value of UPMODE extends to occupy approximately half of each switching cycle. The current mode regulation is active at this time in order to shorten the duration of MAGNETIZE so as to control the duration that UPMODE and MAGNETIZE are simultaneously asserted which, in turn, causes switch S2 to be closed by virtue of the action of AND gate 160. As before, if MAGNETIZE is asserted then S1 is conducting. However S1 can also remain conducting if EXTINCT is asserted or if UPMODE is asserted whilst CLKBB is not asserted. It can therefore be seen that, in the regime shown in FIG. 12, switch S1 becomes opened (non-conducting) only when CLKBB is asserted. Opening switch S1 corresponds to fast discharge of the coil so once again the circuit acts to superimpose a fast charge phase and a fast discharge phase in order to maintain current ripple in the coil despite the fact that Vin and Vout are substantially equal.

Figure 13:
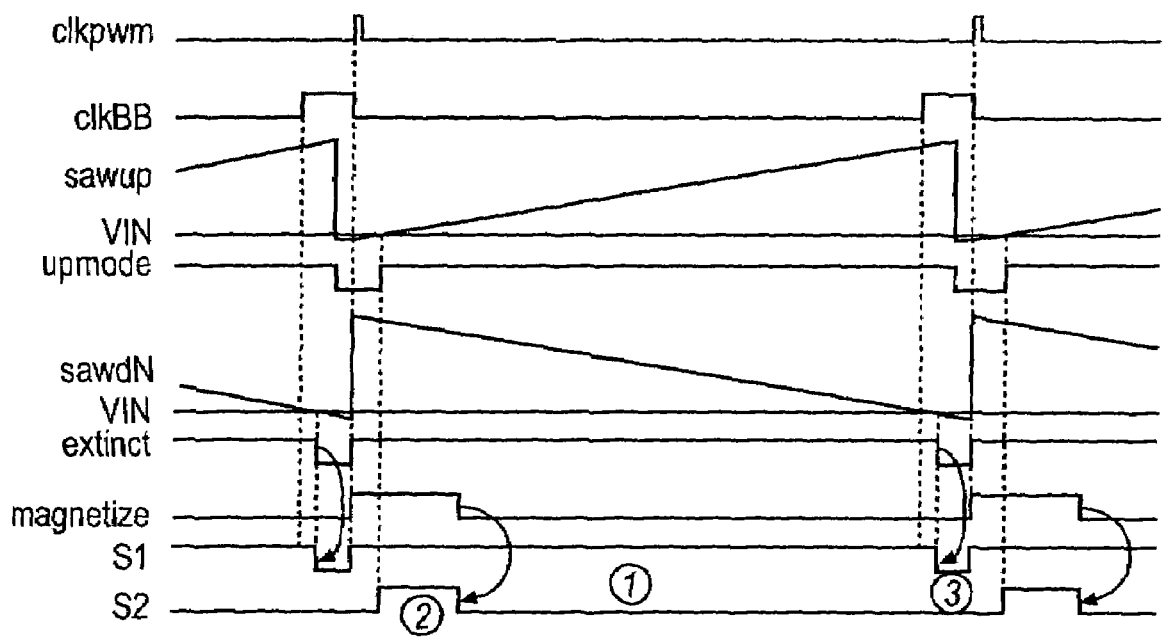
FIG. 13 is a timing diagram showing the relative timings of the various control signals within the circuit of FIG. 9 when operating in a BUCKBOOST mode with Vin<Vout.
Figure 14:
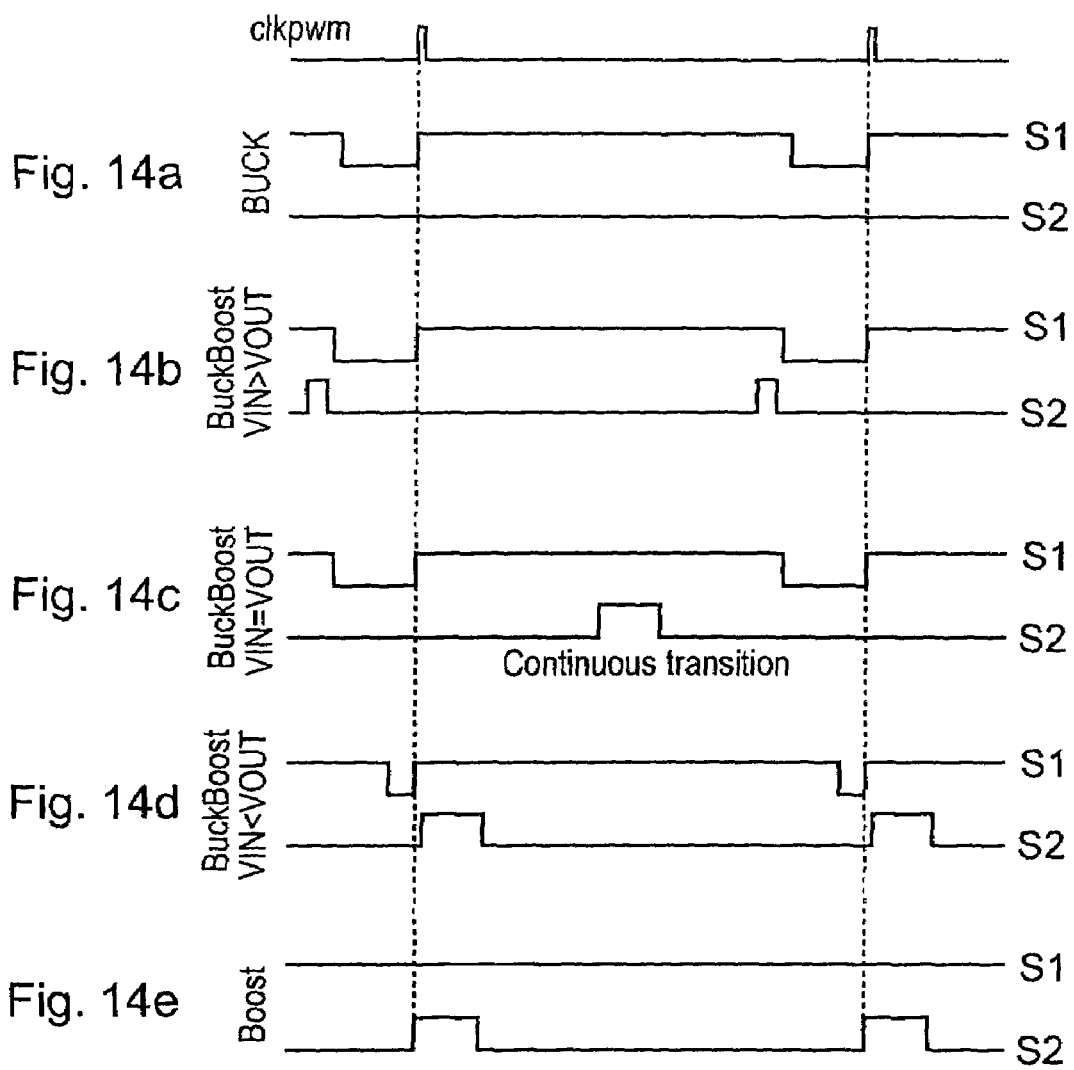
FIG. 14a to 14e show the relative timings for control signals for switches S1 and S2 in FIG. 9 as the circuit transitions from BUCK mode to BUCKBOOST mode to BOOST mode.

FIG. 13 illustrates the operation of the circuit shown in FIG. 9 when Vin is lower than Vout but not sufficiently lower in order to avoid operating in BUCK-BOOST mode. It can now be seen that the signal SAWUP exceeds the value Vin for most of the time and consequently UPMODE is generally asserted. Similarly, Vin is less than SAWDN for most of the time and therefore EXTINCT is also asserted for most of the time. MAGNETIZE, which is, as before, set by the clock, CLOCKPWM becomes reset by the current control circuit comprising operational amplifiers 42, 70 and comparator 62. As a result, switching on of switch S2 becomes delayed by a shorter time, because MAGNETIZE and UPMODE are both asserted earlier, but switch S2 gets switched OFF as soon as MAGNETIZE gets reset. It can be seen that the duration for which EXTINCT is low falls within the duration of CLKBB being asserted and this causes switch S1 to be switched off for only a short period of time giving rise to the fast discharge mode. It can be seen that the duration for which switch S1 is non-conducting becomes progressively diminished between FIGS. 10, 12 and 13 and we are in effect, transiting towards the regime where switch S1 is permanently conducting.

FIGS. 14a to 14e show exemplary waveforms of the circuit of FIG. 9 as it transitions between operating in a pure BUCK mode at FIG. 14a to operating in BUCKBOOST mode with Vin>Vout at FIG. 14b, to operating in BUCKBOOST mode with Vin equal to Vout at FIG. 14c, to operating in BUCK-BOOST mode with Vin<Vout at FIG. 14d, and finally operating in pure BOOST mode at FIG. 14e.

Comparing the figures, it can be seen that the time period in switch S1 is made non-conducting always occurs immediately preceding the clock pulse CLOCKPWM and the duration progressively shortens, finally becoming zero, as we move from FIG. 14a to FIG. 14c. It can also be seen that the time for which switch S2 is conducting changes in a continuous transition with switch S2 being permanently non-conducting in FIG. 14a, and then becoming briefly conducting in a time slot immediately preceding switch S1 being made non-conducting in FIG. 14b, then, as we move to FIG. 14c the time slot for which switch S2 becomes conducting starts to transition from the end of one switching cycle in FIG. 14b towards occurring at the beginning of the switching cycle in FIGS. 14d and 14e. Thus there is a smooth and continuous transition between the operating modes thereby avoiding giving rise to any glitches in the regulated output voltage of the converter due to transition between any of the modes. Put another way, there is a steady and continuous shift in the position of the rising edge of the signal for switching S2 on and similarly the duration of the signal MAGNETIZE and shortens in a continuous way as Vin decreases.

The second embodiment of the present invention relies on sensing the input voltage. However the measured input voltage does not always correspond to the effective input voltage when the serial resistance of the coil and the semiconductor switches is taken into account. This resistance varies with coil current and can also vary with temperature and bias conditions.

Figure 15:
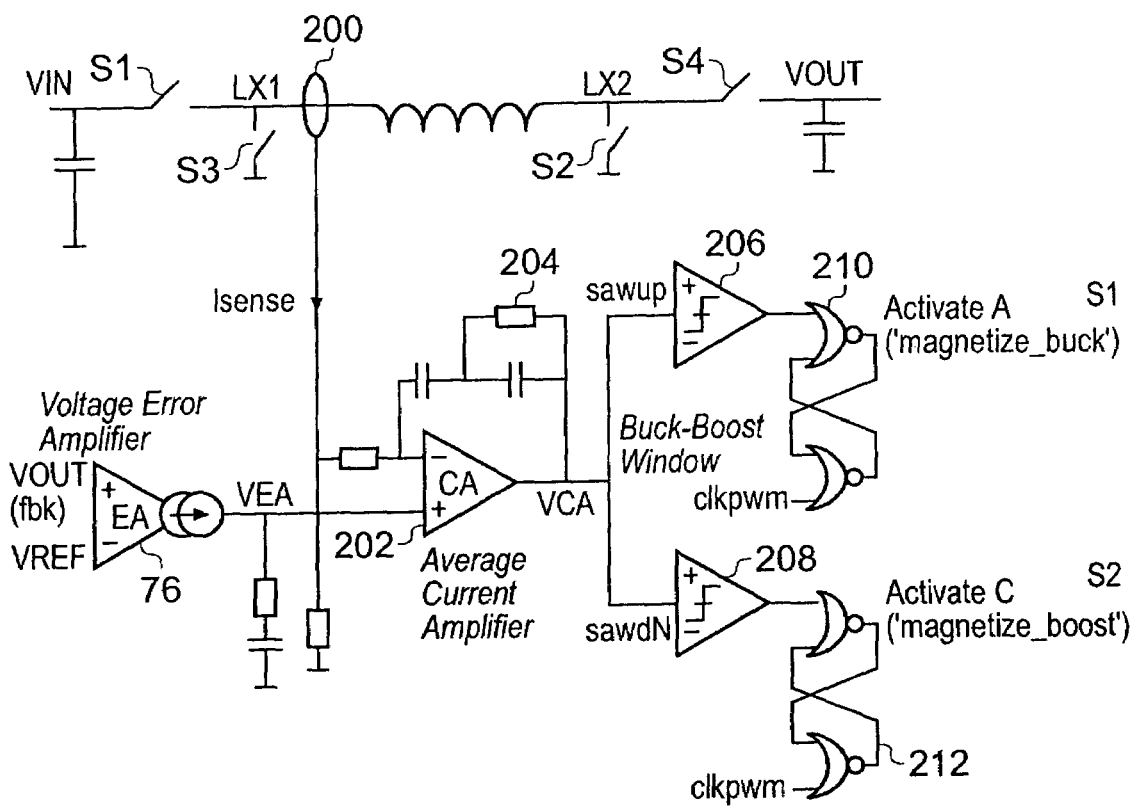
FIG. 15 shows a DC to DC converter constituting a third embodiment of the present invention.

The arrangement shown in FIG. 15 is a further embodiment of the invention

As before, the current flowing into the coil is sensed and this has been shown as being a generic sensing arrangement 200 although it could, of course, comprise a sense resistor 40 and current amplifier 42 as shown in FIG. 9. The sensed current is provided to the inverting input of an operational amplifier 202. A voltage error amplifier 70 as hereinbefore described compares the output voltage Vout with a reference voltage and this is provided to the non-inverting input of the amplifier 202. A feedback network 204 forming an integrator causes the amplifier 202 to form a moving average of the coil current.

The amplifier output is provided to the non-inverting input of a first comparator 206 and also to the non-inverting input of a second comparator 208. The first comparator 206 receives a SAWUP saw tooth whereas the comparator 208 receives a SAWDN saw tooth waveform. The SAWUP and SAWDN waveforms are voltage shifted versions of one another. The comparator 206 is followed by a set reset flip-flop 210 whose output is used to drive switch S1. The comparator 208 is followed by a further set reset flip-flop 212 whose output is used to drive switch S2. In use the saw tooth waveforms SAWUP and SAWDN are synchronised to the clock pulse CLKPWM with, in this example, the voltage of the saw tooth waveform starting high and dropping to a minimum value before the commencement of the next clock pulse.

In use, if Vout fluctuates then the voltage error amplifier 70 adapts the voltage VEA, that is used as a driver to cause a change to occur at the output of the average current amplifier, and this change varies the duty cycle for switches S1 and S2. In the steady state the duty cycle depends on Vout and the effective input voltage Vin. Since the voltage VCA at the output of the average current amplifier when compared to a saw tooth (either SAWUP or SAWDN) adjusts the duty cycle, then the voltage VCA indicates the relative value of Vin compared to Vout. As a consequence, control can be performed purely based on VCA and the effective input voltage Vin need no longer be considered as it is indirectly accounted for by the value VCA.

Figure 16A:
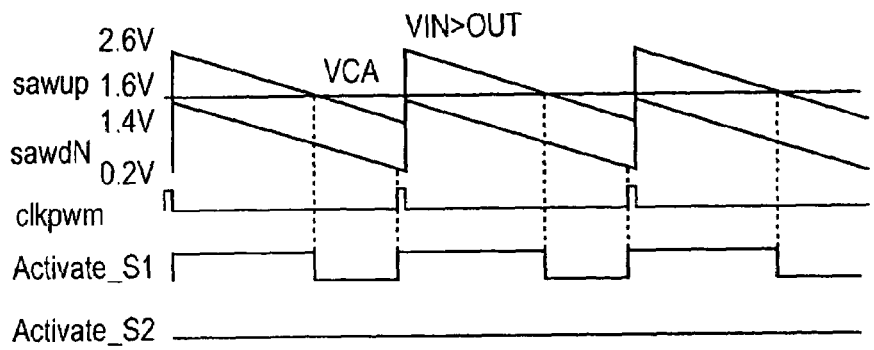
FIGS. 16a to 16d are timing diagrams illustrating operation of the circuit shown in FIG. 15.

When Vin is significantly greater than Vout, as shown in FIG. 16a the value of VCA is always greater than the value of SAWDN. Therefore the control signal for switch S2 is such that switch S2 is always held non-conducting. However the voltage of VCA when compared to the SAWUP signal is sometimes greater than SAWUP and sometimes less than SAWUP. Therefore the output of the comparator 206 makes transitions between high and low and consequently the switch S1 is initially closed, but gets opened when VCA becomes less than SAWUP. Therefore the duty cycle of S1 is adjusted to account for the average current in the coil and the output voltage Vout.

Figure 16B:
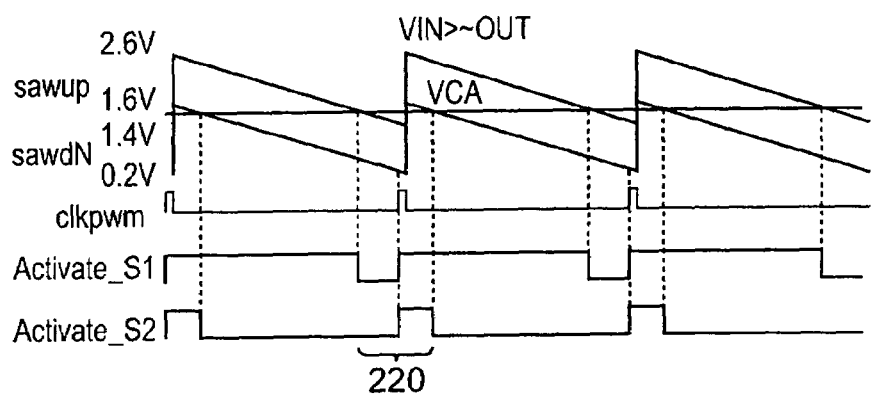

Referring to FIG. 16b, if the effective input voltage Vin decreases, then the voltage VCA varies so as to set the duty cycle for switch S1 for a longer duration. It can be seen that there are moments when the voltage VCA is less than the instantaneous value of both SAWUP and SAWDN and as a result there are periods of time when both S1 and S2 are closed, thereby initiating rapid build up of current in the coil, thereby giving rise to a nonzero value of current ripple within the coil. This corresponds to BUCKBOOST operation.

Figure 16C:
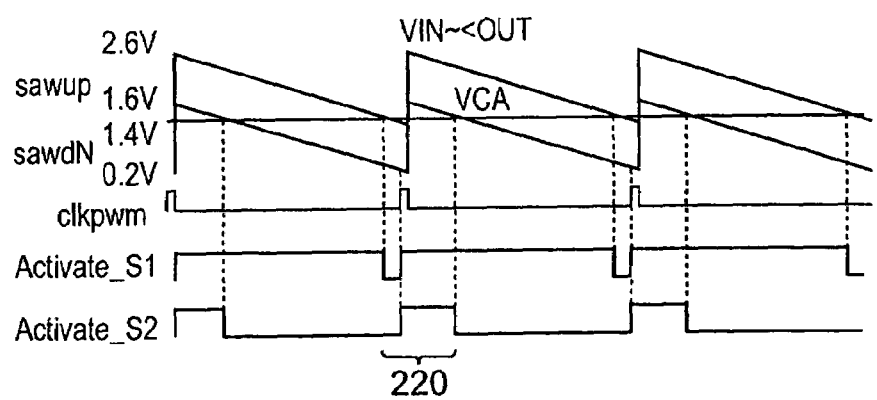
Figure 16D:
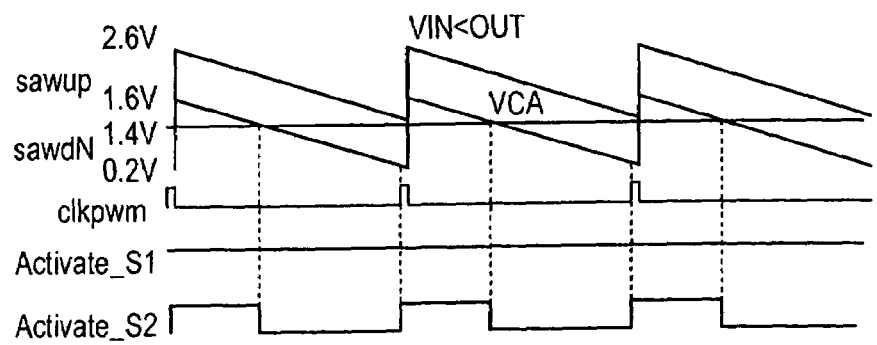

As we move to FIG. 16c, the effective input voltage is reduced further and is now less than Vout. The value of VCA changes to compensate for this and we arrive at a stage where the duty cycle for switch S1 is nearly 100%. However the duty cycle for switch S2 has also become increased and hence the current ripple is maintained. The sequence of switching switches S1 and S2 has maintained the same order. A space in the control signal for switch S1 occurs before the mark in the control signal for switch S2 as generally indicated in the time frame labelled 220 and therefore there are no transient voltages generated in the output of the DC to DC converter as the input voltage varies with respect to the output voltage. Finally, we move to FIG. 16d where Vin has decreased to such an extent that the value of VCA is now always less than the value of SAWUP and consequently switch S1 is always conducting. Switch S2 switches on and off depending on the instantaneous value of SAWDN and therefore the converter can now be seen to be operating in a pure BOOST mode.

In exemplary embodiments of the present invention, the saw tooth of the SAWDN has a minimum voltage of 0.2 volts and a maximum voltage of 1.6 volts, and the saw tooth wave SAWUP has a minimum voltage of 1.4 volts and a maximum voltage of 2.6 volts, thereby giving rise to an overlap range of 1.4 volts to 1.6 volts.

We have therefore described three different embodiments of a control system for a DC to DC converter wherein the relative sequence of switching switches S1 and S2 on and off is maintained as a transition is made from Vin much greater than Vout to Vin much less than Vout.

It will be appreciated that losses within the circuit can be reduced if active rectifiers are used in place of passive ones, and this can be achieved by providing a third switch, switch S3, which is driven in anti-phase with the signal for switch S1 and a fourth switch, switch S4, driven in anti-phase with the second switch, switch S2.

It is thus possible to provide a improved DC-DC converter.

The invention claimed is:

1. A DC to DC converter comprising an inductor, first and second electronically controllable switches and a controller, wherein the first electronically controlled switch is interposed between an input node and a first terminal of the inductor and the second electronically controllable switch extends between a second terminal of the inductor and a ground, and where one of a first rectifier and a third electronically controlled switch extends between the ground and the first terminal of the inductor, and one of a second rectifier and a fourth electronically controlled switch connects the second terminal of the inductor to an output node, wherein the controller controls the operation of the first and second switches to perform voltage step down or voltage step up, as appropriate, to achieve a desired output voltage; and wherein the controller is responsive to measurements of current through the inductor and output voltage, and wherein an error voltage representative of an output voltage error and a measurement of current in the inductor are combined in an integrator to form a control signal, and the control signal is compared with a first time varying sawtooth signal to control operation of the first switch, and the control signal is compared with a second time varying sawtooth signal to control operation of the second switch.

2. A DC to DC converter as claimed in claim 1, in which during operation as a step-down converter the converter can operate in a first mode where the first switch is switched between conducting and non-conducting states and the second switch is non-conducting whilst the input voltage exceeds the output voltage by a first threshold.

3. A DC to DC converter as claimed in claim 2, in which during operation as a step down converter the converter can operate in a second mode where the second switch is switched into a conducting state for a time period that coincides with the first switch being conducting.

4. A DC to DC converter as claimed in claim 3, in which during operation in the second mode the input voltage exceeds the output voltage by less than the first threshold.

5. A DC to DC converter as claimed in claim 1, in which during operation as a step-up converter the converter can operate in a third mode where the first switch is opened (becomes non-conducting) during a portion of each conversion cycle and the second switch is conducting for a period immediately preceding the closing of the first switch and the second switch is conducting for longer than the first switch is non-conducting.

6. A DC to DC converter as claimed in claim 5, in which the converter operates in the third mode when the input voltage is less than the output voltage and the difference between the magnitude of the output voltage and the magnitude of the input voltage is less than second threshold.

7. A DC to DC calculator as claimed in claim 1, in which during operation as a step-up converter the converter can operate in a fourth mode where the first switch is permanently conducting and the second switch is switched between conducting and non-conducting states whilst the input voltage is less than the output voltage by a second threshold.

8. A DC to DC converter as claimed in claim 1, in which an assessment of a difference between a target output voltage or the actual output voltage and the input voltage is made to control the switching times and/or duration of conduction or non-conduction of the first and second switches.

9. A DC to DC converter as claimed in claim 1, wherein the first and second time varying signals are sawtooth waveforms, one being offset with respect to the other.

10. A DC to DC converter as claimed in claim 1, in which a first comparator compares the first time varying signal with the control voltage, and an output of the first comparator is provided to a first latch and an output of the first latch is used to control the first switch; and a second comparator compares the second time varying signal with the control voltage, and an output of the second comparator is provided to a second latch and an output of the second latch is used to control the second switch.

11. A method of operating a DC to DC converter comprising an inductor, first and second electronically controllable switches and a controller, wherein the first electronically controlled switch is interposed between an input node and a first terminal of the inductor and the second electronically controllable switch extends between a second terminal of the inductor and a ground, and where one of a first rectifier and although a third electrically controlled switch extends between the ground and the first terminal of the inductor, and one of a second rectifier and a fourth electrically controllable switch connects the second terminal of the inductor to an output node, wherein the controller is arranged to control the operation of the first and second switches to perform voltage step down or voltage step up, as appropriate, to achieve a desired output voltage; and wherein the controller is responsive to measurements of current and an output voltage error, and a difference representing a voltage error and the current is formed in an integrator to form a control value which is compared with a first linear ramp signal to control operation of the first switch and with a second linear ramp signal to control operation of the second switch.

12. A method of operating a DC to DC converter as claimed in claim 11, in which during operation as a step-down converter the converter can operate in a first mode where the first switch is switched between conducting and non-conducting states and the second switch is non-conducting whilst the input voltage exceeds the output voltage by a first threshold.

13. A method of operating a DC to DC converter as claimed in claim 12, in which during operation as a step down converter the converter can operate in a second mode where the second switch is switched into a conducting state for a time period that overlaps with the first switch being conducting.

14. A method of operating a DC to DC converter as claimed in claim 13, in which during operation in the second mode the input voltage exceeds the output voltage by less than the first threshold.

15. A method of operating a DC to DC converter as claimed in claim 11, in which during operation as a step-up converter the converter can operate in a third mode where the first switch is opened (becomes non-conducting) during a portion of each conversion cycle and the second switch is conducting for a period immediately preceding the closing of the first switch and the second switch is conducting for longer than the first switch is non-conducting.

16. A method of operating a DC to DC converter as claimed in claim 15, in which the converter operates in the third mode when the input voltage is less than the output voltage and the difference between the magnitude of the output voltage and the magnitude of the input voltage is less than second threshold.

17. A method of operating a DC to DC calculator as claimed in claim 11, in which during operation as a step-up converter the converter can operate in a fourth mode where the first switch is permanently conducting and the second switch is switched between conducting and non-conducting states whilst the input voltage is less than the output voltage by a second threshold.

18. A method of operating a DC to DC converter as claimed in claim 11, in which an assessment of a difference between a target output voltage and the input voltage or the output voltage and the input voltage is made to control the switching times and/or duration of conduction or non-conduction of the first and second switches.

* * * * *